United States Patent
Kim

(10) Patent No.: US 8,175,102 B2
(45) Date of Patent: May 8, 2012

(54) NEIGHBOR DISCOVERY METHOD AND APPARATUS FOR MOBILE NODE IN HETEROGENEOUS NETWORK ENVIRONMENT

(75) Inventor: Jong Yol Kim, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 194 days.

(21) Appl. No.: 12/167,982

(22) Filed: Jul. 3, 2008

(65) Prior Publication Data
US 2009/0052347 A1    Feb. 26, 2009

(30) Foreign Application Priority Data
Aug. 22, 2007 (KR) .................. 10-2007-0084541

(51) Int. Cl.
*H04L 12/56* (2006.01)
(52) U.S. Cl. .................................. 370/395.53
(58) Field of Classification Search ............. 370/395.53, 370/389, 330, 329
See application file for complete search history.

(56) References Cited

U.S. PATENT DOCUMENTS

| | | | |
|---|---|---|---|
| 2005/0175007 A1* | 8/2005 | Park et al. | 370/390 |
| 2006/0187882 A1* | 8/2006 | Kwak et al. | 370/331 |
| 2006/0230151 A1 | 10/2006 | Kim et al. | |
| 2007/0140163 A1* | 6/2007 | Meier et al. | 370/329 |
| 2007/0153810 A1* | 7/2007 | Jang et al. | 370/395.53 |
| 2008/0043665 A1* | 2/2008 | Jeon et al. | 370/328 |

FOREIGN PATENT DOCUMENTS

| KR | 10-2007-0014440 A | 2/2007 |
|---|---|---|
| WO | 2006/052563 A2 | 5/2006 |

OTHER PUBLICATIONS

Draft IEEE Standard for Local and Metropolitan Area Networks: Media Independent Handover Services, IEEE P802.21/D00.05, Jan. 2006, Institute of Electrical and Electronics Engineers, Inc., New York, USA.

* cited by examiner

*Primary Examiner* — Dang Ton
*Assistant Examiner* — Nourali Mansoury
(74) *Attorney, Agent, or Firm* — Jefferson IP Law, LLP

(57) ABSTRACT

A neighbor discovery method and apparatus for performing network-transparent neighbor discovery in a heterogeneous network environment is provided. A neighbor discovery method for a multi-mode mobile node includes determining a type of a network, with which a mobile node is in communication, in response to a detection of a request for sending a neighbor solicitation message, retrieving, if the network type identifies a self-processing network, information about the network from a database, determining whether a tentative address contained in the neighbor solicitation message is already in use by another node with reference to the information about the network, and generating, when the tentative address is already in use, a neighbor advertisement message.

18 Claims, 4 Drawing Sheets

NEIGHBOR DISCOVERY METHOD AND APPARATUS FOR MOBILE NODE IN HETEROGENEOUS NETWORK ENVIRONMENT

PRIORITY

This application claims the benefit under 35 U.S.C. §119(a) of a Korean patent application filed in the Korean Intellectual Property Office on Aug. 22, 2007 and assigned Serial No. 2007-0084541, the entire disclosure of which is hereby incorporated by reference.

BACKGROUND OF THE INVENTION

1. Field of the Invention

The present invention relates to a neighbor discovery mechanism in a heterogeneous network environment. More particularly, the present invention relates to a neighbor discovery method and apparatus that is capable of performing a network-transparent neighbor discovery procedure in a heterogeneous network environment.

2. Description of the Related Art

With advances in technologies and the advent of various Internet services, the number of Internet Protocol (IP) networks and network users have increased dramatically. The increase in the number of networks and devices accessing the networks cause various problems such as an exhaustion of IP addresses (i.e., the 32-bit IP version 4 (IPv4) addresses), an increase in network complexity, a service delay, a reduced level of security and an insufficient degree of compatibility with new technologies. IP version 6 (IPv6) has been proposed for addressing such shortcomings in the conventional IPv4.

IPv6 is a 128-bits addressing system that addresses the address exhaustion problem of IPv4. In addition to the advantage of larger address space, IPv6 has features such as Neighbor Discovery (ND), Router Discovery (RD), Stateless Address Autoconfiguration, Dynamic Host Configuration Protocol version 6 (DHCPv6), Maximum Transport Unit (MTU) discovery, etc. Here, the ND protocol is implemented for recovering a neighbor node (host or router), and the RD protocol is implemented to discover routers on the local link to which the host is connected. The Stateless Address Autoconfiguration allows a node to configure itself with a globally unique IPv6 address, and the DHCPv6 is used to statefully assign IP addresses and other networking information to the nodes. The MTU discovery is used for determining a maximum transmission unit size on the network path between two nodes to avoid IP fragmentation.

In the meantime, in order for a mobile node to roam across heterogeneous networks while maintaining a certain Quality of Service (QoS), an intelligent handover technique is required. Media Independent Handover (MIH) is a standard being developed by the Institute of Electrical and Electronics Engineer (IEEE) 802.21 to enable the handover of IP sessions and it supports IPv6.

However, the ND function, as a key feature of the IPv6, specified in the current IEEE 802.21 specification is insufficient for implementation in all the types of heterogeneous environment scenarios. This is because the different technology networks perform the neighbor discovery in different manners. For example, the IEEE 802.3 and 802.11 networks operate with Media Access Control (MAC) based routing protocols, while the IEEE 802.16 networks use a tunneling technique with a Connection Identifier (CID) rather than a MAC address. Accordingly, there is a need to develop a neighbor discovery technique that enables the MIH to operate in a manner that is transparent to network interfaces.

SUMMARY OF THE INVENTION

An aspect of the present invention is to address the above-mentioned problems and/or disadvantages and to provide at least the advantages described below. Accordingly, an aspect of the present invention is to provide an IPv6 neighbor discovery method and apparatus that is capable of performing network-transparent neighbor discovery in a heterogeneous network environment.

In accordance with an aspect of the present invention, a neighbor discovery method for a multi-mode mobile node is provided. The method includes determining a type of a network, with which a mobile node is in communication, in response to a detection of a request for sending a neighbor solicitation message, retrieving, if the network type identifies a self-processing network, information about the network from a database, determining whether a tentative address contained in the neighbor solicitation message is already in use by another node with reference to the information about the network, and generating, when the tentative address is already in use, a neighbor advertisement message.

In accordance with another aspect of the present invention, a neighbor discovery apparatus for a multi-mode mobile node is provided. The apparatus includes an upper layer unit for generating a neighbor solicitation message requesting information about neighbor nodes, and a neighbor discovery unit for processing the neighbor solicitation message depending on a type of network.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the spirit and scope of the invention. Also, descriptions of well-known functions and constructions are omitted for clarity and conciseness.

Figure 1:
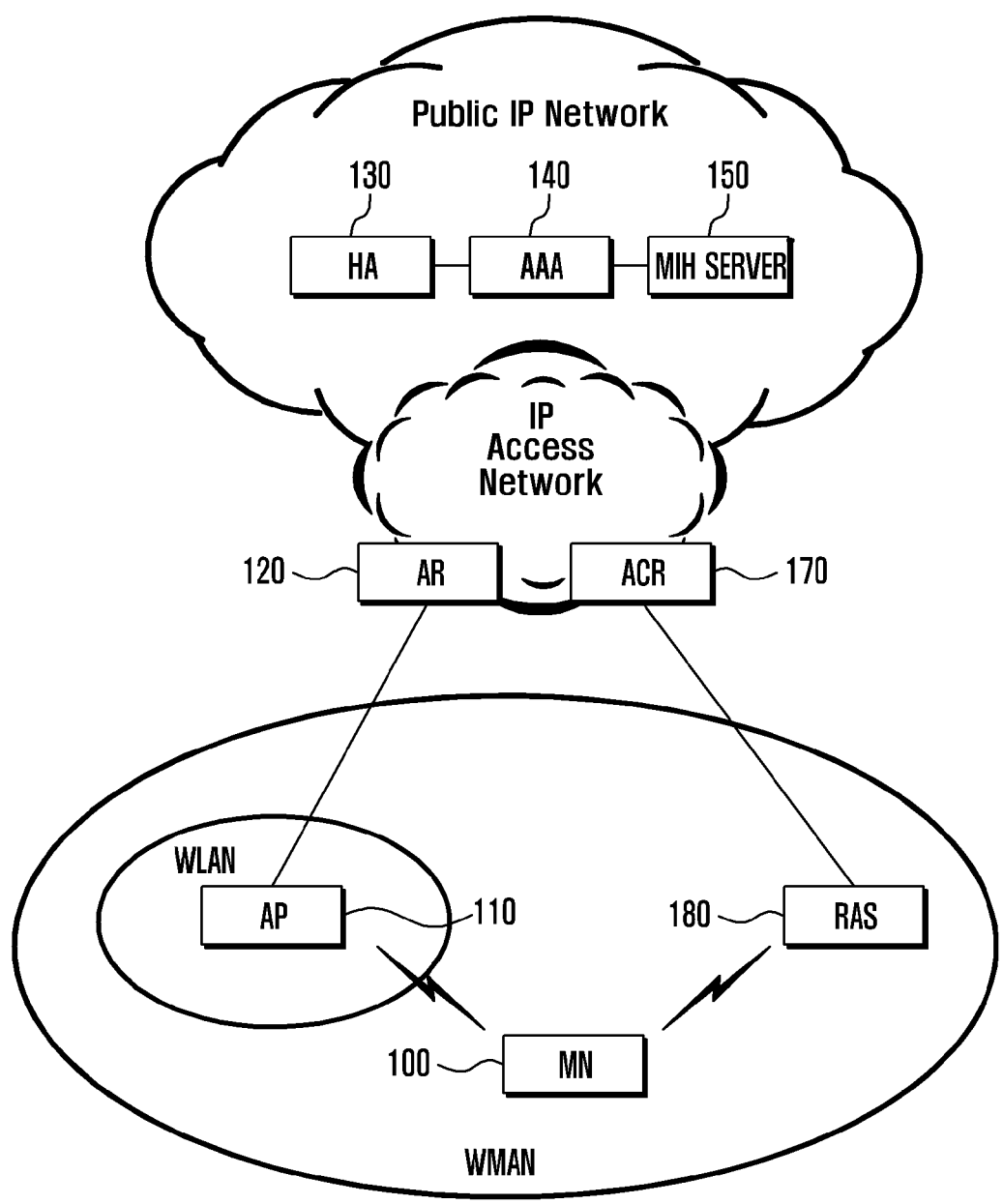
FIG. 1 is a schematic diagram illustrating a heterogeneous network environment to which an MIH according to an exemplary embodiment of the present invention applies.

FIG. 1 is a schematic diagram illustrating a heterogeneous network environment to which an MIH according to an exemplary embodiment of the present invention applies.

Although the heterogeneous network environment is depicted with an IEEE 802.11 standard-based Wireless Local Area Network (WLAN) and an IEEE 802.16 standard-based Wireless Metropolitan Access Network (WMAN), the present invention is equally applicable to any two heterogeneous network environments such as at least any two of cellular networks, WLANs and WMANs, Wireless Broadband Access (WBA) networks and the like.

Referring to FIG. 1, a Mobile Node (MN) 100 connects to the public IP network (i.e., the Internet) via an Access Point (AP) 110 of a WLAN and then an Access Router (AR) 120 of an IP access network for receiving packet data service. The AR 120 is responsible for routing packets to and from the MN 100 and acts as a Foreign Agent (FA). The AP 100 provides radio access service to a geographic coverage area and acts as a bridge between the wireless and wired networks. Here, the term routing refers to a process of selecting paths for delivering packets to their destinations with reference to the address information contained in the headers of the packets.

In this exemplary embodiment, the MN 100 is a dual-band dual-mode (DBDM) mobile terminal supporting the IEEE 802.16-based WMAN and the IEEE 802.11-based WLAN. Accordingly, the MN 100 is provided with a dual-band modulator/demodulator (MODEM).

The DBDM mobile terminal can be implemented with at least two modems for supporting at least two different wireless networks.

In association with the WMAN, the MN 100 accesses a Radio Access Station (RAS) 180. The RAS 180 performs authentication and a security function on the MN 100. The RAS 180 is connected to an Access Control Router (ACR) 170 which belongs to the IP access network and manages IP routing, IP multicast, accounting, and mobility.

The public IP network includes a Home Agent (HA) 130, an Authentication, Authorization, and Accounting (AAA) server 140, and an MIH server 150. In an exemplary implementation, the HA 130 is network equipment located in the home network of the MN 100. The HA 130 is a router in the home network of the MN 100 that maintains information about the current location of the MN 100, performs packet encapsulation, and forwards packets to the MN 100 located in a foreign network using a tunneling technique. The AAA server 140 is responsible for authenticating and authorizing the MN 100 and performs billing and accounting functions. The MIH server 150 manages network resources for supporting handover between networks based on different technology. In this exemplary embodiment, the MIH server provides the MN 100 with information on the neighbor networks in response to a network information request transmitted by the MN 100 using MIH services.

In this exemplary embodiment, the MN 100, the AP 110, and the RAS 180 are implemented to support the MIH functions and services. That is, all the networks and the MN 100 support the MIH to facilitate the inter-technology handover. Although it is mentioned that the AP 110 and the RAS 180 support the MIH, other network entities also can be implemented to support the MIH function.

A structure of the MIH-enabled mobile node is described hereinafter with reference to FIG. 2.

Figure 2:
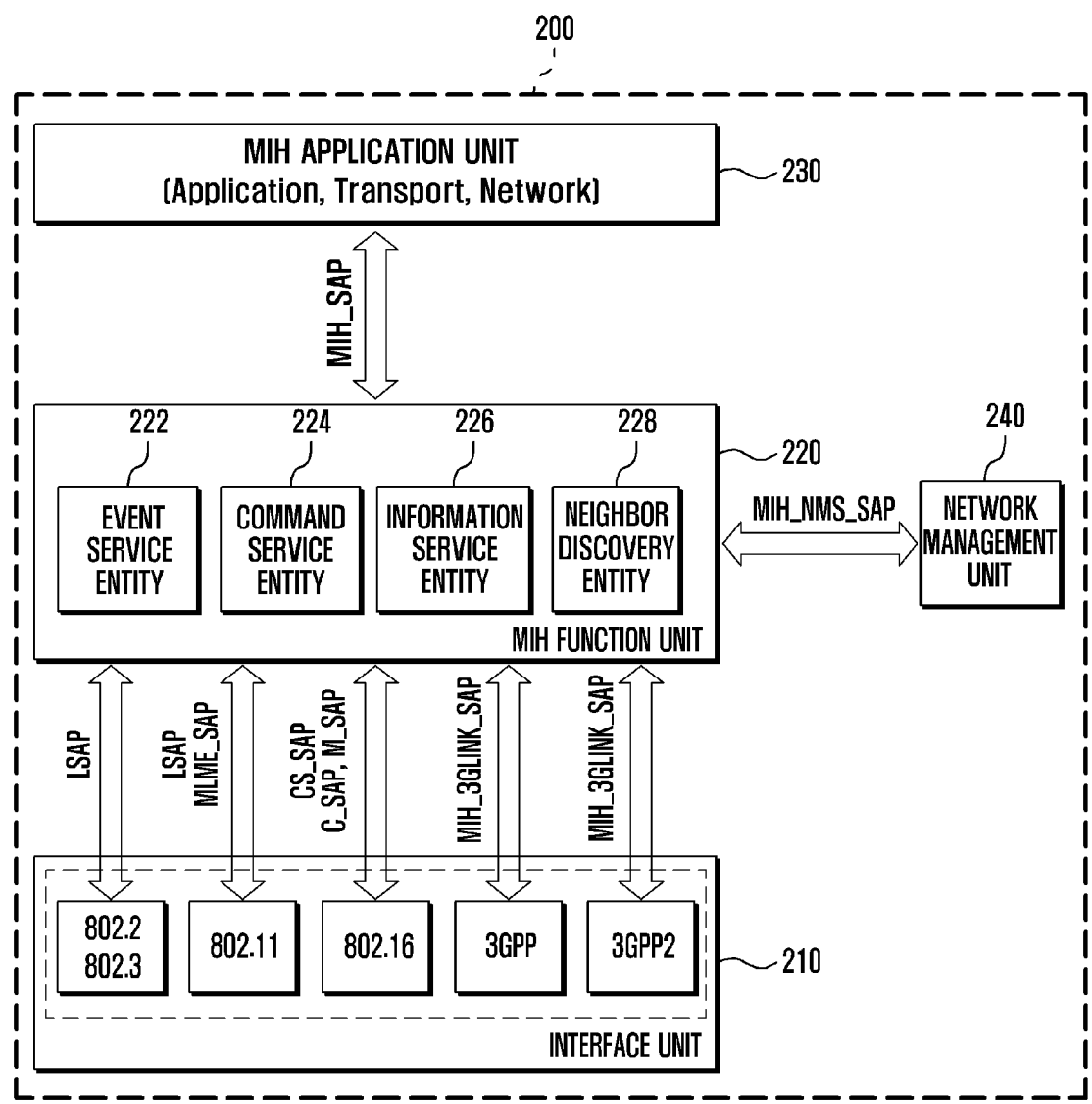
FIG. 2 is a block diagram illustrating a configuration of a mobile node according to an exemplary embodiment of the present invention.

FIG. 2 is a block diagram illustrating a configuration of a mobile node according to an exemplary embodiment of the present invention. In this exemplary embodiment, the MN is provided with multiple network interfaces.

Referring to FIG. 2, the MN 200 includes an interface unit 210, an MIH function unit 220, an MIH application unit 230, and a network management unit 240. The interface unit 210 comprises a plurality of interface entities having physical layer and MAC layer properties of networks based on differing technologies. More particularly, the interface unit 210 may include an 802.2 and 802.3 interface entity for allowing communication with an IEEE 802.2 or 802.3 network, an 802.11 interface entity for allowing communication with an IEEE 802.11 WLAN, an 802.16 interface entity for allowing communication with an IEEE 802.16 WMAN, a 3rd Generation Partnership Project (3GPP) interface entity for allowing communication with a 3GPP based network, and a 3rd Generation Partnership Project 2 (3GPP2) interface entity for allowing communication with a 3GPP2 based network. The interface unit 210 may further include other communication standard interface entities. The interface entities communicate with the MIH unit function 220 via respective Service Access Points (SAPs).

The MIH function unit 220 acts as an interface between the individual interface entities and the MIH application unit 230. The MIH function unit 220 includes an event service entity 222 for managing event information exchanged between the MN 200 and a Point of Attachment, a command service entity 224 for managing commands, an information service entity 226 for managing network information, and a neighbor discovery entity 228 for performing neighbor discovery.

The event service entity 222 sends event information indicating a state change of the MN or current Point of Attachment to another MN or Point of Attachment and provides event services received from another MN or Point of Attachment. The Point of Attachment is a node of a specific network performing MIH. The Point of Attachment can be any of an AP of WLAN, RAS of WiBro network, Node-B of Wideband Code Division Multiple Access (WCDMA) network, Base Transceiver Station (BTS) of CDMA network and the like.

The command service entity 224 exchanges command information with a peer entity of the Point of Attachment and controls the MN or the Point of Attachment on the basis of the command information. The information service entity 226 requests information about neighbor network information and receives the neighbor network information from other MNs and/or Points of Attachment. The neighbor discovery entity 228 performs the neighbor discovery process. The neighbor discovery process is described below in more detail with reference to FIG. 3.

The MIH application unit 230 performs the services served by the MIH function unit 220. The MIH function unit 220 exchanges messages with the MIH application unit 230 via an MIH_SAP. The network management unit 240 collects network information and status information and stores the collected information. The network information and status is delivered to the MIH function unit 220 via an MIH_NMS_SAP.

As mentioned above, the neighbor discovery method and apparatus of an exemplary embodiment of the present invention aims to clear the obstacles to apply the MIH in various heterogeneous network environments, particularly due to the CID based routing mechanism of the IEEE 802.16 network. The neighbor discovery method and apparatus of an exemplary embodiment of the present invention generates an IP address by exploiting the IPv6 functions for performing the MIH in the heterogeneous environment. The neighbor discovery method and apparatus of exemplary embodiments of the present invention is described in more detail with reference to FIGS. 3 and 4.

Figure 3:
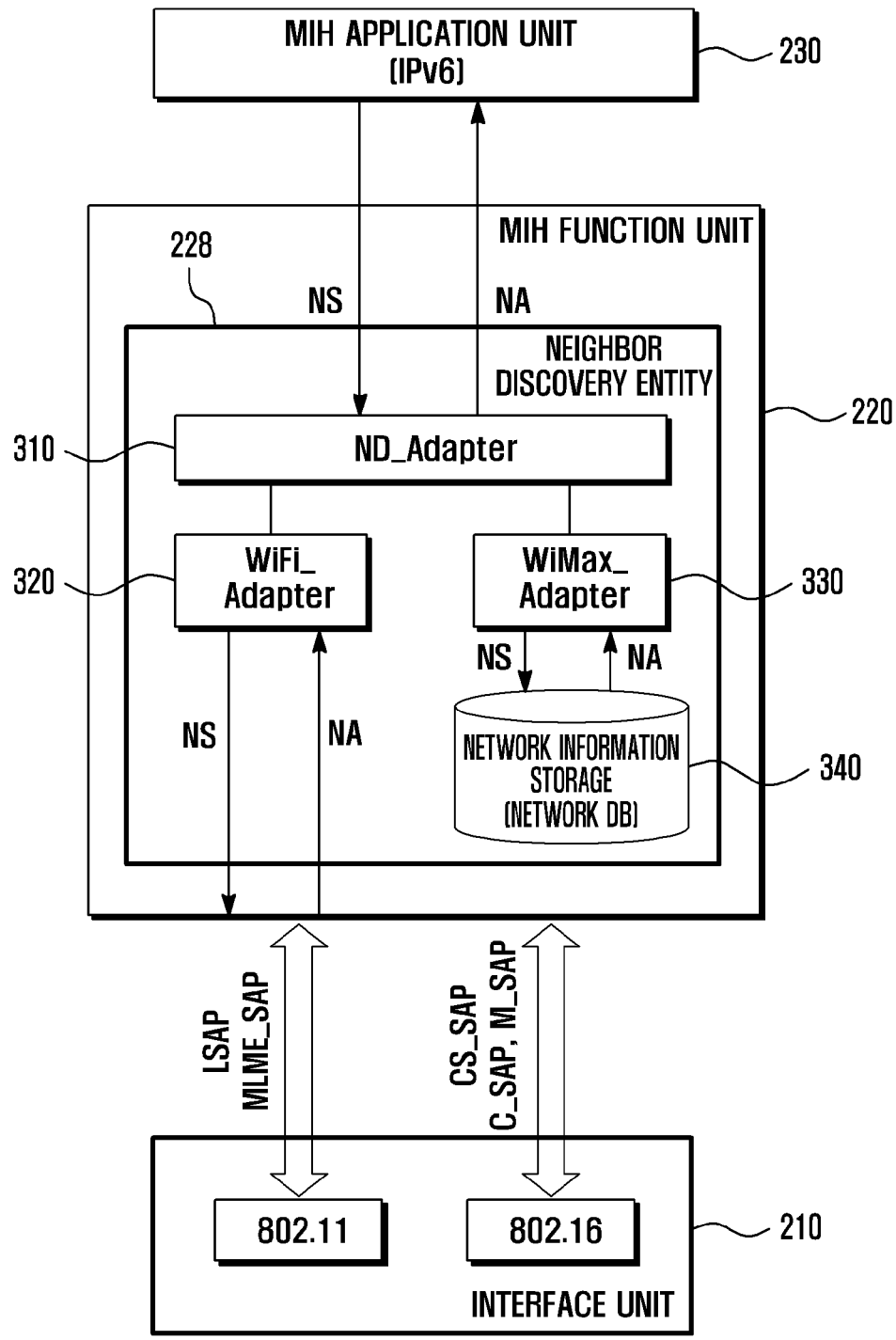
FIG. 3 is a block diagram illustrating a neighbor discovery mechanism of the mobile node in FIG. 2.

FIG. 3 is a block diagram illustrating a neighbor discovery mechanism of the mobile node in FIG. 2. The neighbor discovery mechanism discovers nodes in a vicinity of the MN. The MN can distinguish access available nodes from access unavailable nodes in its vicinity. The neighbor discovery mechanism allows the MN to acquire a link layer address of an associated neighbor node and detects a change of the link layer address such that an invalid cache value is eliminated. The term "node" is used to refer to the host, router, mobile node, base station (e.g., RAS), and router (e.g., ACR). In the following, the term "host" is used interchangeably with Mobile Node (MN), and the term "router" is used interchangeably with base station. Also, the term "base station equipment" is used to refer to a combination of a base station and a controller.

In FIG. 3, for the purpose of simplifying the explanation, only the 802.11 and 802.16 interface entities are depicted as an example of the internal elements of the interface unit 210. The 802.11 interface entity can perform the neighbor discovery normally using the IPv6 protocol. However, the 802.16 interface entity may cause a network overhead problem while performing the neighbor discovery using the IPv6 protocol. The MIH function unit 220 is provided with a neighbor discovery entity 228, which includes a Network Discovery Adaptor (ND Adapter) 310, a WiFi Adaptor 320 for processing communication with the IEEE 802.11 network, a WiMax Adaptor 330 for processing IEEE 802.16 network communication, and a network DataBase (DB) 340 for storing the network information.

Figure 4:
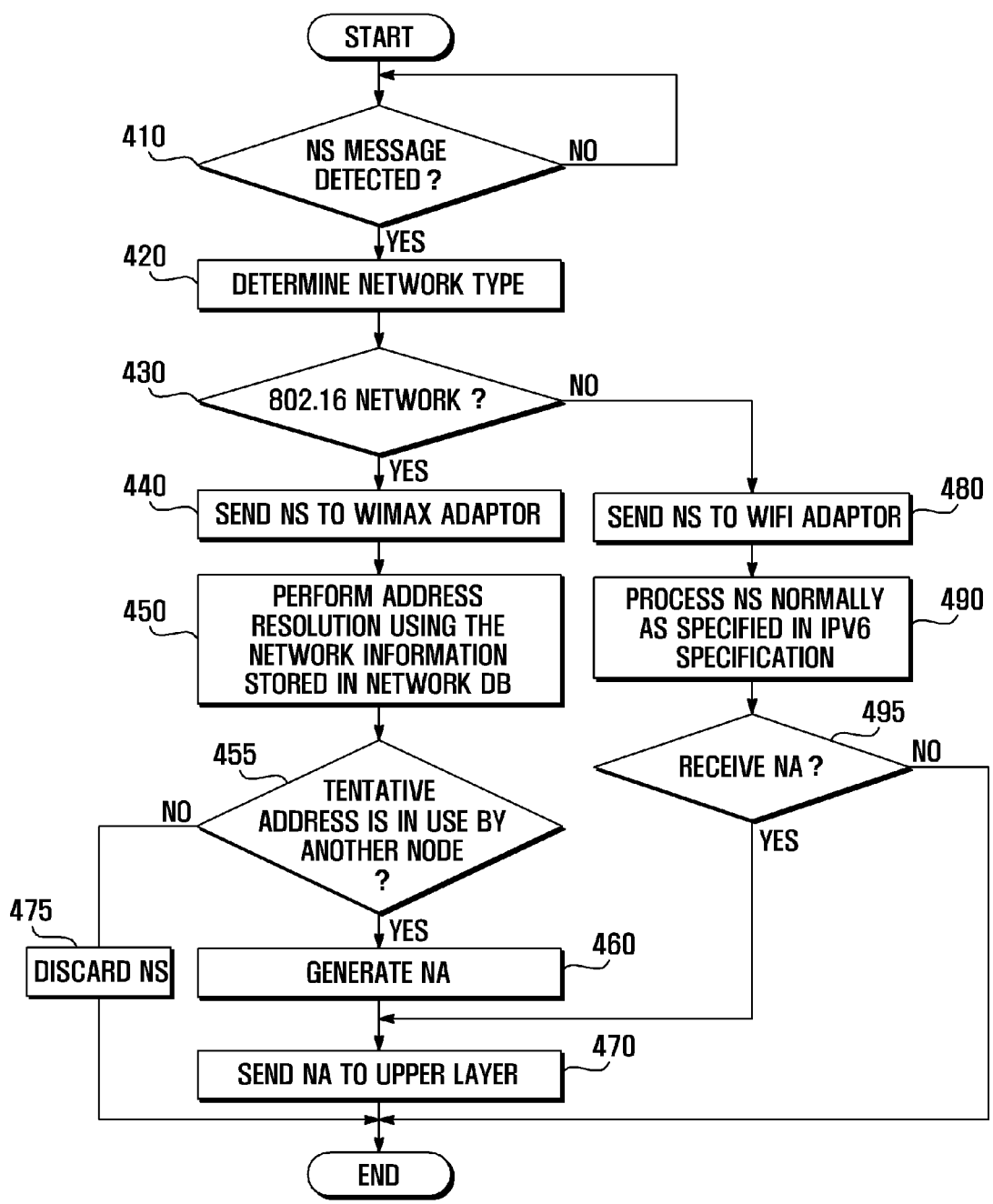
FIG. 4 is a flowchart illustrating a neighbor discovery method according to an exemplary embodiment of the present invention.

FIG. 4 is a flowchart illustrating a neighbor discovery method according to an exemplary embodiment of the present invention.

Referring to FIGS. 3 and 4, a control unit (not shown) of the MN 200 determines whether the MIH application unit 230, i.e. an upper layer application supporting the IPv6 protocol stack, outputs a Neighbor Solicitation (NS) message to the neighbor discovery entity 228 of the MIH function unit 220 in step 410. The control unit controls general operations of the MN 200 and, more particularly, controls the neighbor discovery in this exemplary embodiment. The NS message is sent by the MN 200 to discover the link layer address of an on-link node. The IPv6 node sends a Neighbor Advertisement (NA) message in response to the receipt of the NS message. These messages are exchanged for the IPv6 stateless address autoconfiguration. IPv6 defines both a stateful and stateless address autoconfiguration mechanisms.

In the stateful address autoconfiguration mechanism, an address management server assigns the address to the mobile node. In the stateless address autoconfiguration mechanism, the MN configures its address on the basis of the network information collected from neighbor nodes. Accordingly, when the MN 200 configures its interface using the stateless address autoconfiguration mechanism, MN 200 must verify that the tentative address is not already in use by another node on the link through a Duplicated Address Detection (DAD) procedure. During the DAD procedure, the NS and NA messages are exchanged between the MN 200 and the network.

If an NS message is detected, the ND adaptor 310 determines the network type of the on-link network node under the control of the controller in step 420 and determines whether the network is an IEEE 802.16 network in step 430. If the network is an IEEE 802.16 network, the control unit sends the NS message to the WiMax adaptor 330 in step 440 and, otherwise, the control unit sends the NS message to the WiFi adaptor 320 in step 480. Since the IEEE 802.16 network operates with a unique neighbor discovery mechanism that is different from neighbor discovery mechanisms employed in other types of networks, the neighbor discovery method of this exemplary embodiment handles the IEEE 802.16 network differently from other types of networks. Upon receiving the NS message, the WiMax adaptor 330 performs an address resolution procedure using the network information stored in the network DB 340 in step 450. Here, the WiMax adaptor 330 determines whether the tentative address contained in the NS message is not in use by another node without sending the NS message to the IEEE 802.16 network. The network DB 340 stores the MAC addresses and IP addresses of the nodes associated with the IEEE 802.16 network. The address resolution can be performed using an address resolution protocol.

After the address resolution procedure, the WiMax adaptor 330 determines whether or not the tentative address is in use by another node on the link in step 455. If the tentative address is used by another node, the WiMax adaptor 330 generates an NA message in step 460 and, otherwise, discards the NS message in step 475. After the WiMax adaptor generates the NA message in step 460, the NA message is sent to the MIH application unit 230, i.e. the upper layer application, via the ND adaptor 310 to indicate that the tentative address is used by another node on the link in step 470.

If the network is not an IEEE 802.16 network in step S430, the control unit forwards the NS message to the WiFi adaptor 320 which is an entity capable of normally processing the NS message as specified in the IPv6 specification in step 480. Upon receiving the NS message, the WiFi adaptor 320 processes the NS message normally as specified in the IPv6 specification in step 490. That is, the WiFi adaptor 320 forwards the NS message to the 802.11 interface entity of the interface unit 210 such that the NS message is multicast to the nodes having the addresses that include the same network prefix on the layer 3. After multicasting the NS message, the control unit determines whether an NA message is received in response to the NS message in step 495. If an NA message is received, the control unit sends the NA message to the MIH application unit 230 and, otherwise, ends the procedure.

In this manner, the neighbor discovery method and apparatus of the present invention allows an IPv6 neighbor discovery mechanism to operate normally in various heterogeneous network environments regardless of network type, whereby the MIH is applicable between the IPv6-based networks.

While the invention has been described with reference to certain exemplary embodiments thereof, it will be understood by those skilled in the art that various changes in form and details may be made therein without departing from the spirit and scope of the invention as defined by the appended claims and their equivalents.

As described above, the neighbor discovery method and apparatus of the present invention enables the IPv6 neighbor discovery mechanism to operate normally with various types of IP-based networks without modification of the IPv6 protocol stack, particularly in layer 2, resulting in an expansion of MIH applicability. Also, the neighbor discovery method and apparatus of the present invention allows the MIH to operate in various heterogeneous network environments without compromise of the conventional IPv6 application services. More particularly, in the Mobile WiMax network, the neighbor discovery method and apparatus can reduce network traffic between mobile nodes and a base station by removing the necessity of a message exchange associated with the neighbor discovery, resulting in a reduction of network overhead of radio access networks and a core network.

What is claimed is:

1. A neighbor discovery method for a multi-mode mobile node, the method comprising:
   determining a network type of a network with which the mobile node is in communication, in response to a detection of a neighbor solicitation message generated by an upper layer unit of the mobile node;
   retrieving, if the network type of the network with which the mobile node is in communication is determined to be a self-processing network, information about the self-processing network from a database;
   determining, if the network type of the network with which the mobile node is in communication is determined to be a self-processing network, whether a tentative address contained in the neighbor solicitation message is already in use by another node with reference to the information about the network with which the mobile node is in communication and without sending the neighbor solicitation message to the self-processing network;
   generating, when the tentative address is already in use, a neighbor advertisement message in response to the neighbor solicitation message; and
   discarding, when the tentative address is not already in use, the neighbor solicitation message.

2. The method of claim 1, wherein the self-processing network comprises a wireless Internet Protocol (IP) network.

3. The method of claim 2, wherein the wireless IP network comprises a Wireless Metropolitan Area Network (WMAN).

4. The method of claim 1, wherein the information about the self-processing network comprises Media Access Control (MAC) addresses and Internet Protocol (IP) addresses of nodes in the self-processing network.

5. The method of claim 1, further comprising processing, if the network type is not determined to be the self-processing network, the neighbor solicitation message as specified in an Internet Protocol (IP) version 6 (IPv6) specification.

6. The method of claim 1, wherein, if the network with which the mobile node is in communication is not the self-processing network, the network with which the mobile node is in communication comprises any of a Local Area Network (LAN), a Wireless Local Area Network (WLAN) and a cellular network.

7. The method of claim 1, wherein, if the tentative address is already in use, the generated neighbor advertisement message is not communicated to the self-processing.

8. The method of claim 1, further comprising processing, if the network type is not determined to be the self-processing network, the neighbor solicitation message by sending the neighbor solicitation message to the network of the type that does not correspond to the self-processing network.

9. A neighbor discovery apparatus for a multi-mode mobile node, the apparatus comprising:
   an upper layer unit for generating a neighbor solicitation message requesting information about neighbor nodes in a network with which the mobile node is in communication; and
   a neighbor discovery unit for processing the neighbor solicitation message depending on a network type of the network with which the mobile node is in communication, wherein the neighbor discovery unit comprises:
   a wireless network processor for determining, if the network type of the network with which the mobile node is in communication corresponds to a self-processing network, whether a tentative address contained in the neighbor solicitation message is already in use by another node with reference to information about the self-processing network and without sending the neighbor solicitation message to the self-processing network, and for generating, if the tentative address is already in use, a neighbor advertisement in response to the neighbor solicitation message,
   a network information inspector for retrieving the network information including the network type of the network with which the mobile node is in communication, and
   a network information storage for storing the network information.

10. The apparatus of claim 9, wherein the self-processing network comprises a wireless Internet Protocol (IP) network.

11. The apparatus of claim 10, wherein the wireless IP network comprises a Wireless Metropolitan Area Network (WMAN).

12. The apparatus of claim 9, wherein the information about the self-processing network comprises Media Access Control (MAC) addresses and Internet Protocol (IP) addresses of nodes in the self-processing network.

13. The apparatus of claim 9, wherein the neighbor discovery unit further comprises a network processor for processing, if the network type does not correspond to the self-processing network, the neighbor solicitation message as specified in an Internet Protocol (IP) version 6 (IPv6) specification.

14. The apparatus of claim 9, wherein, if the network with which the mobile node is in communication does not correspond to the self-processing network, the network with which the mobile node is in communication comprises any of a Local Area Network (LAN), a Wireless Local Area Network (WLAN) and a cellular network.

15. The apparatus of claim 9, wherein the neighbor solicitation message is discarded if the wireless network processor determines that the tentative address is not already in use by another node.

16. The apparatus of claim 9, wherein the neighbor discovery unit is included in a media-independent handover function module.

17. The apparatus of claim 9, wherein, when the tentative address is already in use, the generated neighbor advertisement message is not communicated to the self-processing network.

18. The apparatus of claim 9, wherein the neighbor discovery unit further comprises a network processor for processing, if the network type does not correspond to the self-processing network, the neighbor solicitation message by sending the neighbor solicitation message to the network of the type that does not correspond to the self-processing network.

* * * * *